(12) United States Patent
Goh et al.

(10) Patent No.: US 9,389,760 B2
(45) Date of Patent: Jul. 12, 2016

(54) INTEGRATED VISUALIZATION

(71) Applicant: Silicon Graphics International Corp., Fremont, CA (US)

(72) Inventors: Eng Lim Goh, Singapore (SG); Hansong Zhang, Fremont, CA (US); Chandrasekhar Murthy, Los Gatos, CA (US)

(73) Assignee: Silicon Graphics International Corporation, Milpitas, CA (US)

( * ) Notice: Subject to any disclaimer, the term of this patent is extended or adjusted under 35 U.S.C. 154(b) by 434 days.

(21) Appl. No.: 13/931,818

(22) Filed: Jun. 29, 2013

(65) Prior Publication Data

US 2014/0068488 A1  Mar. 6, 2014

Related U.S. Application Data

(60) Provisional application No. 61/696,078, filed on Aug. 31, 2012.

(51) Int. Cl.
| | | |
|---|---|---|
| G06F 3/048 | (2013.01) | |
| G06F 3/0484 | (2013.01) | |
| G06F 9/44 | (2006.01) | |
| G06F 11/36 | (2006.01) | |

(52) U.S. Cl.
CPC ............ G06F 3/0484 (2013.01); G06F 9/4443 (2013.01); G06F 11/3636 (2013.01)

(58) Field of Classification Search
None
See application file for complete search history.

(56) References Cited

U.S. PATENT DOCUMENTS

| | | | | |
|---|---|---|---|---|
| 5,956,483 | A * | 9/1999 | Grate | G06F 9/4425 709/203 |
| 7,516,127 | B2 * | 4/2009 | Starch | G06F 17/30557 707/999.01 |
| 8,065,658 | B1 * | 11/2011 | Bali | G06F 8/70 717/113 |
| 2002/0098876 | A1 * | 7/2002 | Engstrom | G06F 3/016 455/566 |
| 2007/0016557 | A1 * | 1/2007 | Moore | G06Q 10/10 707/999.003 |
| 2008/0250251 | A1 * | 10/2008 | Lin | G06F 21/10 713/189 |
| 2009/0013314 | A1 * | 1/2009 | Opaterny | G06F 11/323 717/158 |
| 2011/0050728 | A1 * | 3/2011 | Williamson | G06Q 10/10 345/649 |
| 2011/0214108 | A1 * | 9/2011 | Grunberg | G06F 11/3612 717/128 |
| 2011/0271230 | A1 * | 11/2011 | Harris | G06F 3/0482 715/810 |
| 2012/0137273 | A1 * | 5/2012 | Meijler | G06F 11/3476 717/128 |
| 2013/0254556 | A1 * | 9/2013 | Kamei | G06F 21/54 713/189 |

\* cited by examiner

*Primary Examiner* — Hua Lu
(74) *Attorney, Agent, or Firm* — Polsinelli LLP

(57) ABSTRACT

A system may provide a visualization function during computational functions performed by a host system. Access to a library of functions including a visualization function is provided. Then, a computing application is executed. The execution of the computing application includes generating multi-dimensional data, invoking the visualization function from the library, and providing a visual representation of at least a portion of the multi-dimensional data for display within the computing application using the visualization function.

20 Claims, 5 Drawing Sheets

INTEGRATED VISUALIZATION

CROSS-REFERENCE TO RELATED APPLICATIONS

This application claims the priority benefit of U.S. Provisional Application Ser. No. 61/696,078, titled "INTEGRATED VISUALIZATION," filed Aug. 31, 2012, the disclosure of which is incorporated herein by reference.

BACKGROUND

1. Field of the Invention

The field of the invention relates to computational processes and in particular to computational processes and visualization processes.

2. Description of the Related Art

Visualization is a valuable tool for understanding data. Computational processes process many types of data, and often result in visualization to provide the resulting data. The visualization is performed once the computational process is complete.

Some functions exist to provide text during the execution of a program. For example, a function can be used to display text characters at certain points during a computational process.

This can be helpful to understand how the computational process is proceeding and to provide insight on data involved in the process. As computer systems continue to process more data, it would be helpful to obtain additional information about the computational process in progress as it was happening. What is needed is an improved solution for providing data during a computational process.

SUMMARY

A system may provide a visualization function during computational functions performed by a host system. Access to a library of functions including a visualization function is provided. Then, a computing application is executed. The execution of the computing application includes generating multi-dimensional data, invoking the visualization function from the library, and providing a visual representation of at least a portion of the multi-dimensional data for display within the computing application using the visualization function.

In an embodiment, a method of producing a graphical representation of a data set during a computational process may begin with operating on a data set by executing one or more first computer program instructions of an application program, wherein the data set is in native memory of the application program. A function call may be executed during the execution of the one or more first computer program instructions, wherein the function call requests the production of a graphical representation of the data set by a visualization program. A graphical representation of at least at portion of the data set may be generated by executing one or more second computer program instructions of the visualization program on the data set in native memory of the application program during the concurrent execution of the one or more first computer program instructions.

DETAILED DESCRIPTION

A system may provide a visualization function during computational functions performed by a host system. Access to a library of functions including a visualization function is provided. Then, a computing application is executed. The execution of the computing application includes generating multi-dimensional data, invoking the visualization function from the library, and providing a visual representation of at least a portion of the multi-dimensional data for display within the computing application using the visualization function.

Figure 1:
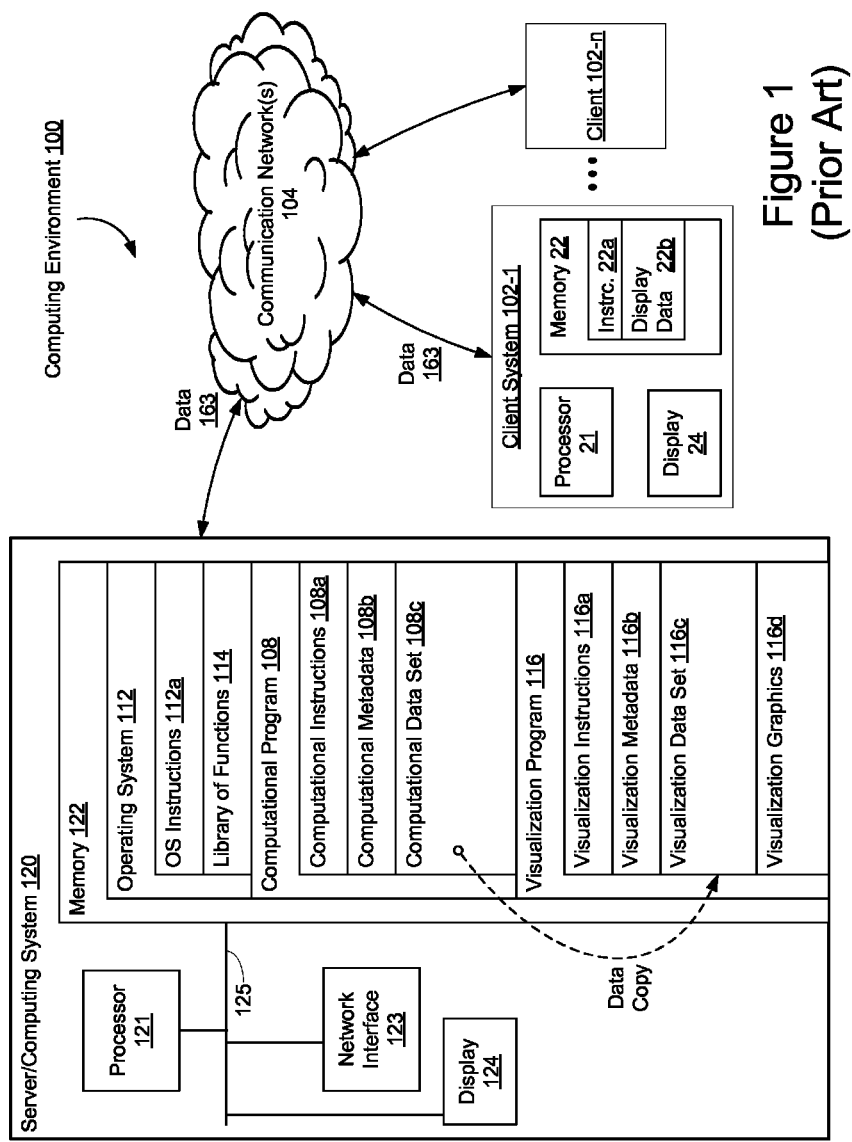
FIG. 1 is a system for providing computation and visualization.

FIG. 1 is a system for providing computation and visualization. The system of FIG. 1 includes server computing system 120, communication network 104, and client systems 102 through 104. Serving computing system 120 communicates with clients 102 and 104 through communication networks 104.

Server computing system 120 includes processor 121, memory 122, network interface 123 and display 124. Bus 125 may provide communication lines between each of processor 121, memory 122, the network interface and the display. Bus 125 may be a memory bus, communication bus, signal bus or some other communication lines for exchanging data, signals and other information between modules 121-124.

Server computer system 120 may implement a host computer. The host computer includes an application program which generates multi-dimensional data for display on the one or more clients. The application program is coupled to or communicates with a Library of Functions, including an in line visualization function, e.g. "printg( )". The function is named so based on the "pringf( )" function in C language. In some embodiments, the visualization function is invoked from within the application program to display multi-dimensional data in the form of a sophisticated visualization such as for example a 3D graphic. In some embodiments, the Library of Functions is configured to call a first graphics package, for example a ggplot2. Additionally or alternatively, in some embodiments, the Library of Functions is configured to call another graphics package for example an open source plotting system. The visualization function is not tied to a specific graphics package.

Processor 121 may execute instructions stored in memory to perform functionality described herein. Network interface 123 may communicate with devices external to system 110 through communication network 110. The network interface 123 may communicate, for example, via radio frequency communications, cellular communications, wired communications, and other communications. Display 124 may be incorporated integral with system 120 or connected with system 120. Display 124 may provide information, such as visualization graphics, as provided by visualization program 116.

Memory 122 includes instructions, platforms, operating systems, libraries, and other data. For example, memory 122 includes operating system 112. Operating system 112 may include operating system instructions 112A and a library of functions 114. The library of functions may include one or more functions which may be called to perform a function.

Computational program 108 within memory 122 includes computational instructions 108A, computational metadata 108B, and computational data set 108C. The computational programs may process and analyze data. The instructions may include logic for processing data having metadata 108B and data sets 108C, while also calling one or more functions from library functions 144.

Visualization program 116 may display information in an interface for display on display 124. Visualization program 116 may include instructions 116A, metadata 116B, and data set 116C. When preparing a visualization graphic, visualization program 116 may copy data from a computational data set 108C to visualization data set 116C within visualization program 116D may then be generated from the data set, metadata and visualization instructions. Copying data from a computational program to a visualization program after the computational program has ceased executing is time consuming and slow.

Clients 130 and 140 may be implemented as computing devices for receiving and sending data and instructions to server system 120 over network 110.

Figure 2:
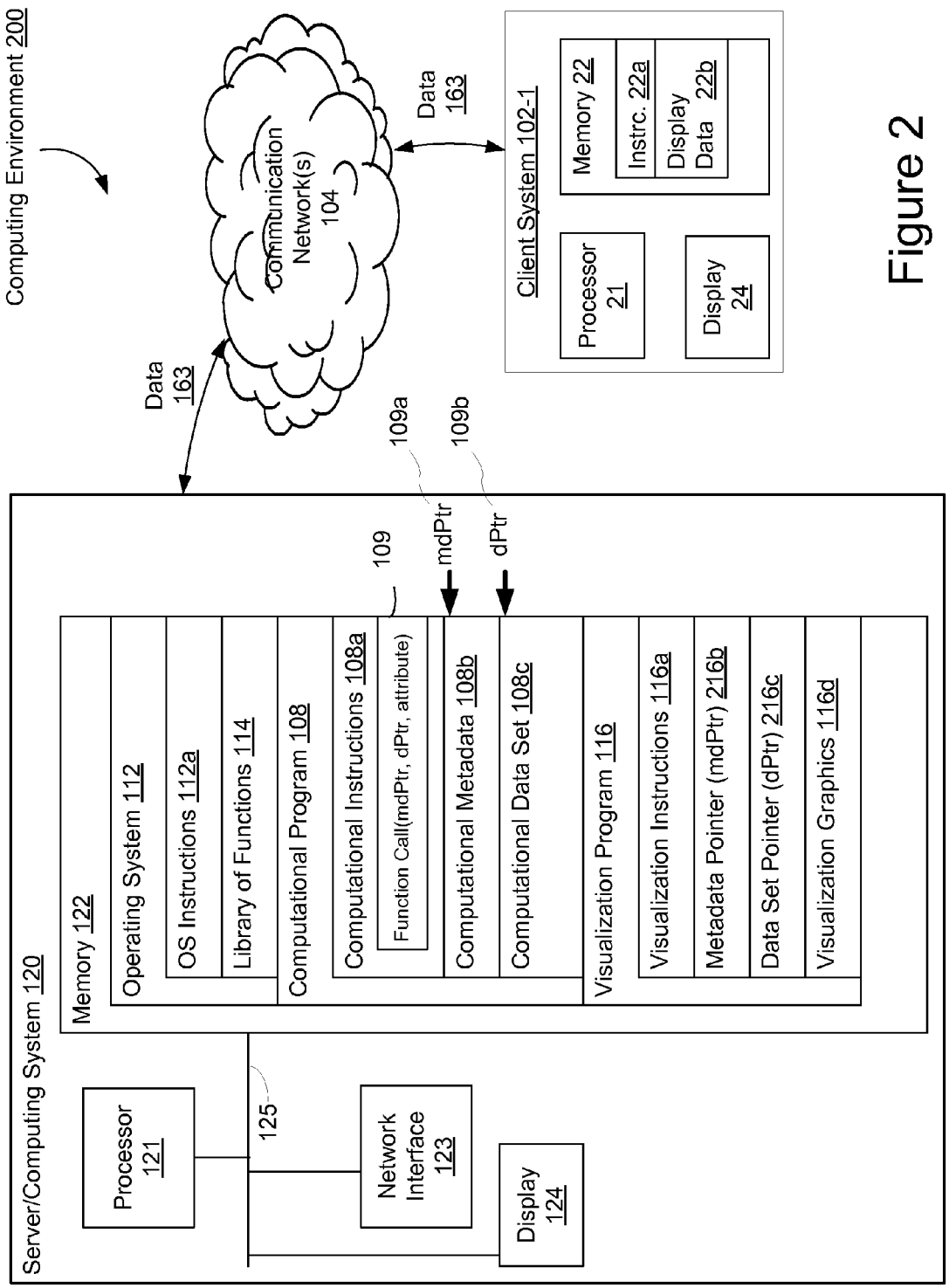
FIG. 2 is a system for providing integrated visualization.

FIG. 2 is a system for providing integrated visualization. The system of FIG. 2 includes server computing system 120, network 110, and client system 130. Client system 130 may include processor 21, memory 22, and display 24. The memory may include instructions 22A and display data 22B. Server computing system 120 may include a processor 121, network interface 123 and display 124 similar to that of FIG. 1.

Memory 122 of server system 120 may include operating system 112, computational program 108, and visualization program 116. The library of functions within operating system 112 may be called by function calls within computational program 108. One function that may be called includes a print g( ) function. The print g function may allow for visualization graphics to be provided while computation instructions are executing.

Computational program 108 includes computational instructions 108A, computational metadata 108B, and computational data set 108C. Within computational instructions 108A includes a function call. The function call has parameters of a metadata pointer, data set pointer, and an attribute. The function call may be looked up within the library of functions 114. Once called, the function within the library function 114 takes the metadata pointer, data pointer and attribute and executes to provide a visualization graphic based on data at the pointers. This is discussed in more detail below. Visualization program 116 may include visualization instructions, a metadata pointer 216B, a data set pointer 216C, and visualization graphics 116D. Visualization instructions include code that when executed configure and provide an interface for visualization graphics. Metadata pointer 216B and data set pointer 216C point to metadata and data associated with graphics to be provided. The visualization graphics themselves at 116D may be based on data and other information.

Figure 3:
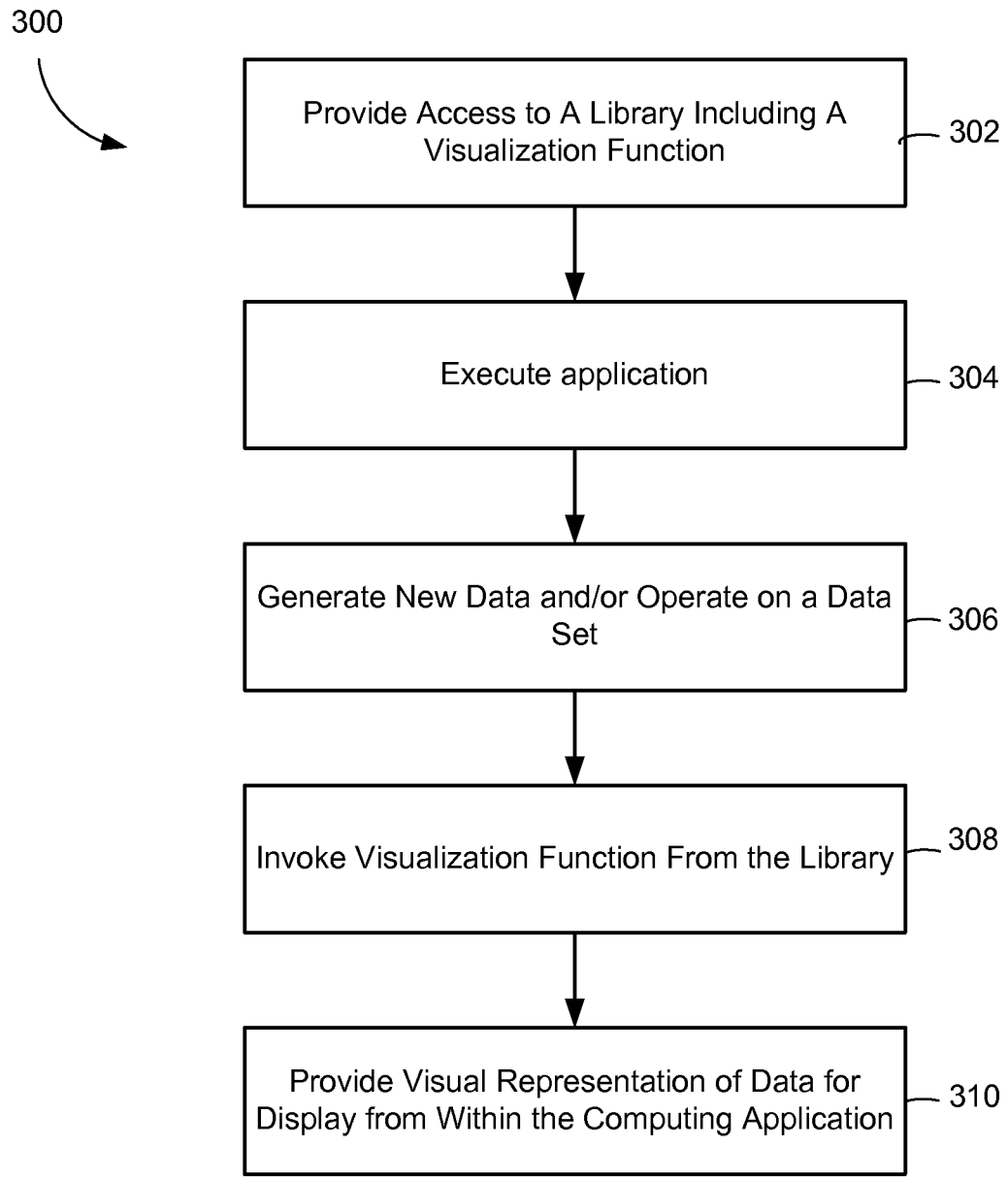
FIG. 3 is a method for providing integrated visualization.

FIG. 3 is a method for providing integrated visualization. The method of FIG. 3 may be performed by system 120 of the method of FIG. 2. First, access is provided to a library which includes a visualization function at 302. The access may be provided by storing the library in memory local to server system 120, such as within the operating system, or remotely from the server in another system which can be easily accessed by the computational program. Next, an application is executed at step 304. After being executed, the application may generate new data or operate on a data set at step 306. Generating new data or operating on data may involve executing a set of instructions such as computational instructions 108A. A visualization function may be invoked from the library at step 308. The visualization function may be embedded within the computational instructions. The function may have a format of print g( ) and then a function and parameters. Next, a visual representation of data is provided for display from within the computing application at step 310. The visual representation may be displayed to include data with a current value during computation.

Figure 4:
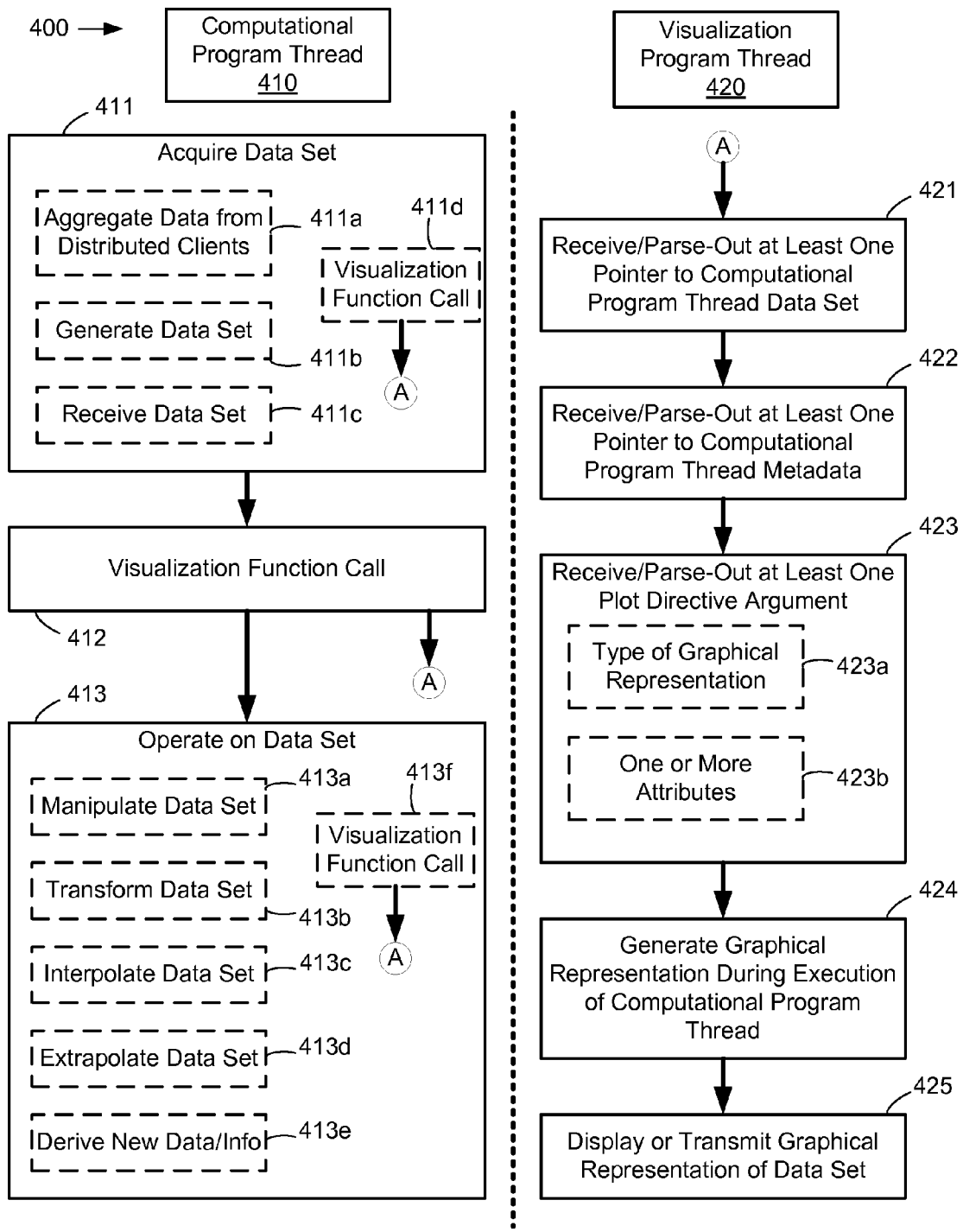
FIG. 4 is a block diagram of a computational and visualization threads.

FIG. 4 is a block diagram of a computational and visualization threads. In operation, a computational program thread 410 may be executed at server system 120. At some point, a visualization function call may be made by the computational program thread. When called, the visualization program thread 420 may be executed.

First, a data set is acquired within the computational program thread. Acquiring a data set may include aggregating data from distributed clients, generating a data set, or receiving a data set. At some point, a call may be made to a visualization function at step 411D. If the visualization function call is made, then the visualization program thread 420 begins at point A.

A visualization function call may be made at step 412. If so, the visualization program thread begins at point A. The data set may be operated on at step 413. Operating on the data set may include manipulating the data set at 413A, transforming the data set at 413B, interpolating the data set at step 413C, extrapolating the data set at step 413D or deriving new data or information at step 413E. At any time during the operations on the data set a visualization function may be called at step 413F. If it is called, then the visualization program thread at step 420 begins.

The visualization program thread begins at point A where at least one pointer to a computational program thread data set is received at step 421. The data set may be dated to display within a visualization or graphical representation. At least one pointer to computational program thread metadata may be received at step 422. The metadata may describe the data set received at step 421.

At least one plot directive argument may be received at step 423A. The plot directive argument may include a type of graphical representation at step 423A, or one or more attributes at step 423B. Next, a graphical representation is generated during execution of computational program thread at step 424. The graphical representation of the data set is then displayed or transmitted at step 425.

Figure 5:
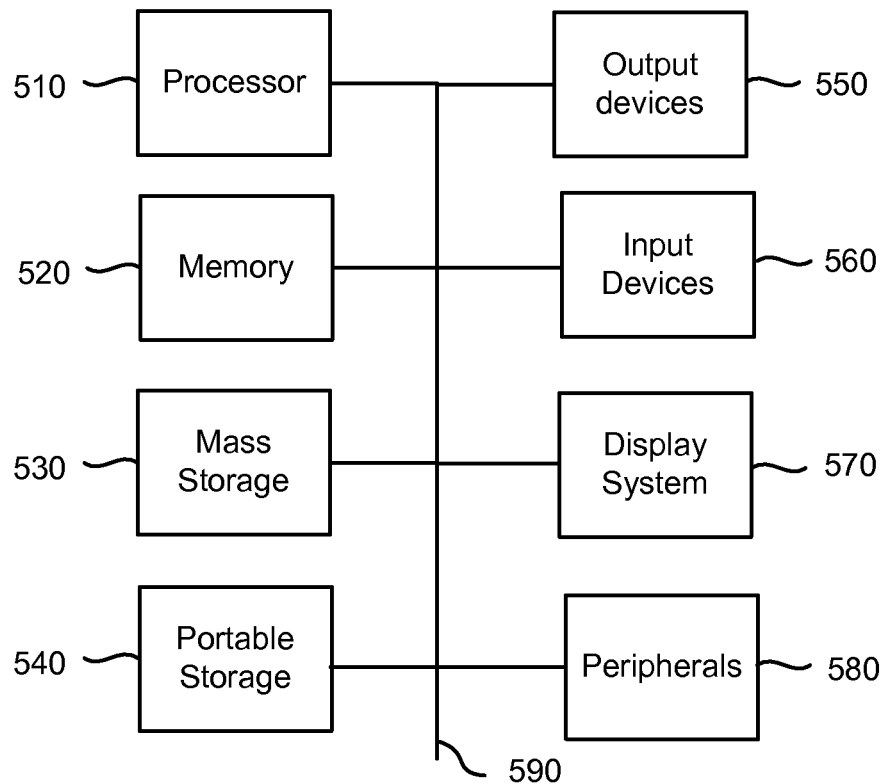
FIG. 5 is a computing system for implementing the present technology.

FIG. 5 is a block diagram of an exemplary computing device for implementing the present technology. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method of producing a graphical representation of a data set during a computational process, the method comprising:

operating on a data set by executing one or more first computer program instructions of an application program, wherein the data set is in native memory of the application program;

executing a visualization function call during the execution of the one or more first computer program instructions, wherein the visualization function call requests a production of a graphical representation of the data set by a visualization program based on the operated data set, and wherein the visualization function call is within the executed one or more first computer program instructions of the application program; and generating a graphical representation of at least a portion of the data set by executing one or more second computer program instructions of the visualization program based on the executed visualization function call within the executed one or more first computer program instructions on the data set in native memory of the application program during the concurrent execution of the one or more first computer program instructions, wherein the generated graphical representation of at least the portion of the data set is continually updated as the application program continues execution of the one or more first computer program instructions.

2. The method of claim 1, wherein maintaining the data set substantially within the native memory of the application program includes one of restricting the visualization program from copying the entirety of the data set, and restricting the visualization program to copying less than threshold amounts of the data set for use during a group of the one or more of the second computer program instructions.

3. The method of claim 1 further comprising displaying the graphical representation of at least a portion of the data set generated by the visualization program.

4. The method of claim 1 further comprising transmitting the graphical representation of at least a portion of the data set generated by the visualization program.

5. The method of claim 1, wherein the application program comprises a computational program thread, and the visualization program comprises a visualization program thread distinct from the computational program thread.

6. The method of claim 1, wherein the visualization function call provides a pointer to the data set being operated on via the executed one or more first computer program instructions to the visualization program.

7. The method of claim 6, wherein the pointer to the data set is an argument of the visualization function call.

8. The method of claim 1, wherein operating on the data set includes at least one of manipulating, formatting, re-ordering, grouping, transforming, interpolating, extrapolating, computing, deriving, simplifying and changing at least a portion of the data set.

9. The method of claim 1, wherein the visualization function call provides a plot directive argument that specifies one or more types of properties of the graphical representation of at least a portion of the data set generated by the visualization program.

10. The method of claim 1, wherein the data set is multi-dimensional.

11. A computer readable non-transitory storage medium having embodied thereon a program, the program being executable by a processor to perform a method for producing a graphical representation of a data set during a computational process, the method comprising:

operating on a data set by executing one or more first computer program instructions of an application program, wherein the data set is in native memory of the application program;

executing a visualization function call during the execution of the one or more first computer program instructions, wherein the visualization function call requests production of a graphical representation of the data set by a visualization program based on the operated data set, and wherein the visualization function call is within the executed one or more first computer program instructions of the application program; and generating a graphical representation of at least a portion of the data set by executing one or more second computer program instructions of the visualization program based on the executed visualization function call within the executed one or more first computer program instructions on the data set in native memory of the application program during the concurrent execution of the one or more first computer program instructions, wherein the generated graphical representation of at least the portion of the data set is continually updated as the application program continues execution of the one or more first computer program instructions.

12. The computer readable non-transitory storage medium of claim 11, wherein maintaining the data set substantially within the native memory of the application program includes one of restricting the visualization program from copying the entirety of the data set, and restricting the visualization program to copying less than threshold amounts of the data set for use during a group of the one or more of the second computer program instructions.

13. The computer readable non-transitory storage medium of claim 11, further comprising displaying the graphical representation of at least a portion of the data set generated by the visualization program.

14. The computer readable non-transitory storage medium of claim 11, further comprising transmitting the graphical representation of at least a portion of the data set generated by the visualization program.

15. The computer readable non-transitory storage medium of claim 11, wherein the application program comprises a computational program thread, and the visualization program comprises a visualization program thread distinct from the computational program thread.

16. The computer readable non-transitory storage medium of claim 11, wherein the visualization function call provides a pointer to the data set being operated on via the executed one or more first computer program instructions to the visualization program.

17. The computer readable non-transitory storage medium of claim 16, wherein the pointer to the data set is an argument of the visualization function call.

18. The computer readable non-transitory storage medium of claim 11, wherein operating on the data set includes at least one of manipulating, formatting, re-ordering, grouping, transforming, interpolating, extrapolating, computing, deriving, simplifying and changing at least a portion of the data set.

19. The computer readable non-transitory storage medium of claim 11, wherein the visualization function call provides a plot directive argument that specifies one or more types of properties of the graphical representation of at least a portion of the data set generated by the visualization program.

20. The computer readable non-transitory storage medium of claim 11, wherein the data set is multi-dimensional.

* * * * *